UNITED STATES PATENT OFFICE.

EDWARD WATSON, OF GRAND RAPIDS, MICHIGAN.

COMPOSITION OF MATTER FOR RESTRAINING THE SETTING OF PLASTER.

SPECIFICATION forming part of Letters Patent No. 458,742, dated September 1, 1891.

Application filed January 5, 1891. Serial No. 376,704. (No specimens.)

*To all whom it may concern:*

Be it known that I, EDWARD WATSON, a citizen of the United States, residing at Grand Rapids, in the county of Kent and State of Michigan, have invented a new and useful Composition of Matter for Restraining the Setting of Plaster, of which the following is a specification.

My invention relates to plaster compounds containing calcined gypsum, which if not restrained sets too rapidly to allow time for proper manipulation in mixing and spreading the plaster.

In carrying out my invention I proceed as follows: The restraining agent is flaxseed-meal or oil-cake meal. After the oil has been extracted I find this material has but slight restraining effect on the setting of plaster if used in the raw condition; but if I treat it as described below it becomes a restraining material of great power.

In the preparation of my material I take of the following ingredients: flaxseed-meal or oil-cake meal, one pound; carbonate of soda or potash, half a pound; lime, one-quarter of a pound, and water enough to thin the mixture, so that it may be easily stirred. I then boil the mixture for half an hour or more, and then add to it about four pounds of any of the salts of the alkaline earths, or salts of the caustic alkalies. The object of adding the salts is to render the mass more pliable, and thus more easily pulverized. The object in adding the lime before boiling the mixture is to combine with the carbonic acid of the carbonate of the alkali, and thus liberate caustic alkali, which is the agent which renders the flaxseed-meal more soluble, and thus greatly increases its effect as a restrainer to the setting of plaster. After preparing the mass as above described it may be allowed to dry or be evaporated to dryness and then ground to a fine powder. The proportions of this material to be used to restrain the setting of plaster must be estimated by the quantity of flaxseed-meal entering the composition. From four to ten pounds of flaxseed-meal treated as above described will be sufficient to restrain the setting of one ton of calcined gypsum from half an hour to three hours or more. In mixing the mortar the restrainer must be proportioned to the calcined gypsum, and no estimate be made of the other ingredients the mortar may contain.

In practice my restrainer prepared as above described may be mixed with the materials at the time the mortar is made, or it may be intimately mixed dry with dry calcined gypsum, and then be ready to use at any subsequent time. This restraining material is an excellent one and has an advantage over restrainers containing glue, as it does not attract moisture and is in every respect a pure and wholesome material.

What I claim is—

The herein-described compound for restraining the setting of calcined gypsum, which consists of flaxseed or oil meal cake and an alkali or its described equivalents combined and reduced to a dry powder, substantially as and for the purpose specified.

EDWARD WATSON.

Witnesses:
JOSEPH J. EMERY,
F. P. CARPENTER.